(12) United States Patent
Ho et al.

(10) Patent No.: US 8,218,694 B2
(45) Date of Patent: Jul. 10, 2012

(54) METHOD FOR TRANSMITTING A DIGITAL SIGNAL, METHOD FOR RECEIVING A DIGITAL SIGNAL, TRANSMITTER AND RECEIVER

(75) Inventors: Chin Keong Ho, Singapore (SG); Yan Wu, Singapore (SG); Sumei Sun, Singapore (SG); Zhongding Lei, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 178 days.

(21) Appl. No.: 11/573,126

(22) PCT Filed: Aug. 3, 2005

(86) PCT No.: PCT/SG2005/000264
§ 371 (c)(1),
(2), (4) Date: Jul. 9, 2008

(87) PCT Pub. No.: WO2006/014141
PCT Pub. Date: Feb. 9, 2006

(65) Prior Publication Data
US 2008/0260070 A1 Oct. 23, 2008

(51) Int. Cl.
*H04B 1/10* (2006.01)
(52) U.S. Cl. ........ 375/346; 375/260; 375/267; 375/295; 375/299; 375/316; 375/340; 375/347; 375/350; 455/63.1; 455/67.13; 455/101; 455/114.2; 455/132; 455/296; 455/500; 455/501; 455/562.1; 370/206; 370/208; 370/210; 370/334; 370/342; 327/551
(58) Field of Classification Search ............... 375/260, 375/295, 267, 299, 316, 340, 347, 346, 350; 455/101, 132, 296, 500, 562.1, 63.1, 67.13, 455/114.2, 501; 370/334, 206, 208, 210, 370/335, 342; 327/551
See application file for complete search history.

(56) References Cited

U.S. PATENT DOCUMENTS
5,610,944 A 3/1997 Mau et al.
(Continued)

FOREIGN PATENT DOCUMENTS
JP A-H10-84329 3/1998
(Continued)

OTHER PUBLICATIONS
Z. Lei, Y. Wu, C.K. Ho, S. Sun, P. He, and Y. Li, "Iterative detection for Walsh-Hadamard Transformed OFDM," in Proc. $57^{th}$ IEEE *Vehicular Technology Conf.*, Jeju, Korea, Apr. 2003, pp. 637-640.

(Continued)

*Primary Examiner* — Leon Flores
(74) *Attorney, Agent, or Firm* — K. David Crockett, Esq.; Niky Economy Syrengelas, Esq.; Crockett & Crockett, PC

(57) ABSTRACT

A transmitter (106) for transmitting a signal, the signal comprising a plurality of signal values, the signal values being grouped to at least one signal value block. The transmitter comprises a pre-transformation unit (101) adapted to process each signal value block by a pre-transformation to produce a block of modulation symbols, wherein the pre-transformation comprises a phase rotation of the signal block values, which corresponds to the multiplication of the signal value block with a phase rotation matrix. The transmitter also comprises a modulation unit (102) adapted to modulate at least one carrier signal based on the modulation symbols and a sending unit (104) adapted to send the modulated carrier signal.

7 Claims, 3 Drawing Sheets

U.S. PATENT DOCUMENTS

| | | |
|---|---|---|
| 6,067,292 A | 5/2000 | Huang et al. |
| 6,125,103 A | 9/2000 | Bäuml et al. |
| 6,298,050 B1 | 10/2001 | van Heeswyk et al. |
| 6,377,632 B1 | 4/2002 | Paulraj et al. |
| 6,426,983 B1 | 7/2002 | Rakib et al. |
| 6,654,408 B1 | 11/2003 | Kadous et al. |
| 6,882,619 B1 | 4/2005 | Gerakoulis |
| 7,680,200 B2 * | 3/2010 | Kwun et al. .................. 375/260 |
| 2002/0131537 A1 | 9/2002 | Storm et al. |
| 2003/0002568 A1 | 1/2003 | Dabak et al. |
| 2004/0086054 A1 | 5/2004 | Corral |
| 2004/0146115 A1 | 7/2004 | Feng et al. |
| 2006/0258316 A1 * | 11/2006 | Lei et al. ....................... 455/296 |
| 2008/0165865 A1 * | 7/2008 | Bar-Ness et al. ............. 375/241 |

FOREIGN PATENT DOCUMENTS

| | | |
|---|---|---|
| WO | WO9516259 | 6/1995 |
| WO | WO02/103974 | 12/2002 |
| WO | WO03/088540 | 4/2003 |
| WO | WO03065635 A1 | 8/2003 |
| WO | WO2004/025841 | 3/2004 |
| WO | WO2004/032347 | 4/2004 |

OTHER PUBLICATIONS

Liu, et al., Linear Constellation Precoding for OFDM with Maximum Multipath Diversity and Coding Gains, 51 IEEE Transactions on Communications 416, (IEEE 2003).

Lin, et al., BER Minimized OFDM Systems with Channel Independent Precoders, 51 IEEE Transactions on Signal Processing 2369, (IEEE 2003).

* cited by examiner

METHOD FOR TRANSMITTING A DIGITAL SIGNAL, METHOD FOR RECEIVING A DIGITAL SIGNAL, TRANSMITTER AND RECEIVER

FIELD OF INVENTION

The invention relates to a method for transmitting a digital signal, a method for receiving a digital signal, a transmitter and a receiver

BACKGROUND OF THE INVENTION

In mobile communications, high user capacities and high data rates are desirable. To achieve this, mobile radio systems have to be highly spectral efficient. Using multicarrier modulation according to OFDM (orthogonal frequency division multiplexing) robust performance and high spectral efficiency can be achieved.

Before the OFDM modulation, a pre-transform can be carried out, resulting in a so-called PT-OFDM (pre-transform OFDM) system.

In [1] (and also in [2]), an iterative detection algorithm for a PT-OFDM system is described. This will be described in the following.

An iteration (corresponding to an iteration index i) of the iterative detection algorithm corresponds to three stages, a reconstruction step, a linear filtering step and a decision step.

In the ith reconstruction step, i.e. in the reconstruction step of the iteration corresponding to the iteration index i, the $m_i$th component of the received signal r (received signal vector) is estimated. This is done by using the previously detected symbol $\hat{x}_{i-1}$ (i.e. the signal vector detected in the previous iteration). $m_i$ corresponds to the frequency domain channel with the ith smallest amplitude. In the filtering step, the cross interference of the data is removed by a linear filter denoted by G. In the detection step, a tentative (hard or soft) decision (denoted by dec(.)) is made to generate the symbol detected in the ith iteration, $\hat{x}_i$.

The algorithm is initialized with $\underline{r}_0 = \underline{r}$, $\underline{\tilde{x}} = \underline{G}\underline{r}_0$ and $\underline{\hat{x}}_0 = \text{dec}(\underline{\tilde{x}}_0)$.

The ith iteration is given by:

$$\underline{r}_i = \underline{1}_{m_i}\underline{r}_{i-1} + \underline{0}_{m_i}\underline{\Gamma W}\underline{\hat{x}}_{i-1}$$

$$\underline{\tilde{x}}_i = \underline{G}\underline{r}_i$$

$$\underline{\hat{x}}_i = \text{dec}(\underline{\tilde{x}}_i)$$

where $\underline{0}_m$ is defined as a diagonal matrix with value 1 on its mth diagonal term and 0 otherwise, and $\underline{1}_m$ as a diagonal matrix with value 0 on its mth diagonal term and 1 otherwise.

In [1], the pre-transform is based on the Walsh-Hadamard transform (WHT) or on other standard transforms.

An object of the invention is to increase the performance of existing transmitting methods.

The object is achieved by the method for transmitting a digital signal, the method for receiving a digital signal, the transmitter and the receiver with the features according to the independent claims.

SUMMARY OF THE INVENTION

A method for transmitting a signal comprising a plurality of signal values is provided, the signal values being grouped to at least one signal value block wherein each signal value block is processed by a pre-transformation to produce a block of modulation symbols. The pre-transformation comprises a phase rotation of the signal block values, which corresponds to the multiplication of the signal value block with a phase rotation matrix. At least one carrier signal is modulated based on the modulation symbols and the modulated carrier signal is sent.

Further, a method for receiving a signal is provided wherein a modulated carrier signal is received and the modulated carrier signal is demodulated to produce a block of modulation symbols. The block of modulation symbols is processed by an inverse pre-transformation, wherein the inverse pre-transformation comprises a phase rotation of the modulation symbols, which corresponds to the multiplication of the block of modulation symbols with a phase rotation matrix.

Further, a transmitter according to the method for transmitting a digital signal described above and a receiver according to the method for receiving a digital signal described above are provided.

SHORT DESCRIPTION OF THE FIGURES

DETAILED DESCRIPTION

Illustratively, a pre-transform is used that comprises a phase rotation. By the phase rotation, errors are evenly spread and error propagation is reduced. Especially when the transform size is small, i.e. when the dimension of the signal value block is small and signal-to-noise ratio is high, performance in terms of BER (bit error rate) is improved with respect to transmitting methods according to prior art.

Embodiments of the inventions arise from the dependent claims. Embodiments of the invention which are described in the context of the method for transmitting a digital signal are also valid for the method for receiving a digital signal the transmitter and the receiver.

The pre-transformation can further comprise a domain transformation of the signal value block. In this case, the pre-transformation can correspond to a multiplication of the signal value block with a product of a phase rotation matrix and a domain transformation matrix, for example a FFT (fast Fourier transform) matrix.

In one embodiment, the domain transformation is performed after the phase rotation.

The domain transformation can be a discrete sine transformation, a discrete cosine transformation or a discrete Fourier transformation. The pre-transformation can also comprise a Walsh-Hadamard-transformation (WHT).

In one embodiment, the phase rotation rotates at least one of the components of the signal value block by an angle that is not zero. In another embodiment, the phase rotation rotates all or all but one of the components of the signal value block by an angle that is not zero. In one embodiment, the absolute values of the components of the signal value block are not changed by the phase rotation.

The phase rotation matrix is for example a diagonal matrix. In one embodiment, the absolute value of all components on the diagonal of the phase rotation matrix is 1.

In one embodiment, the phase rotation matrix has the form diag(1, α, ..., $α^{M-1}$) where α=exp(−jπ/(2M)) and M is the dimension of the signal value block. Other values can be used for α or for the diagonal elements of the phase rotation matrix such that other phase rotations are realized.

The invention can for example be used in communication systems according to WLAN 11a, WLAN 11g, Super 3G, HIPERLAN 2 and WIMAX (Worldwide Interoperability for Microwave Access).

The methods according to the invention can be carried out by a computer which is supplied with the corresponding instructions.

Figure 1:
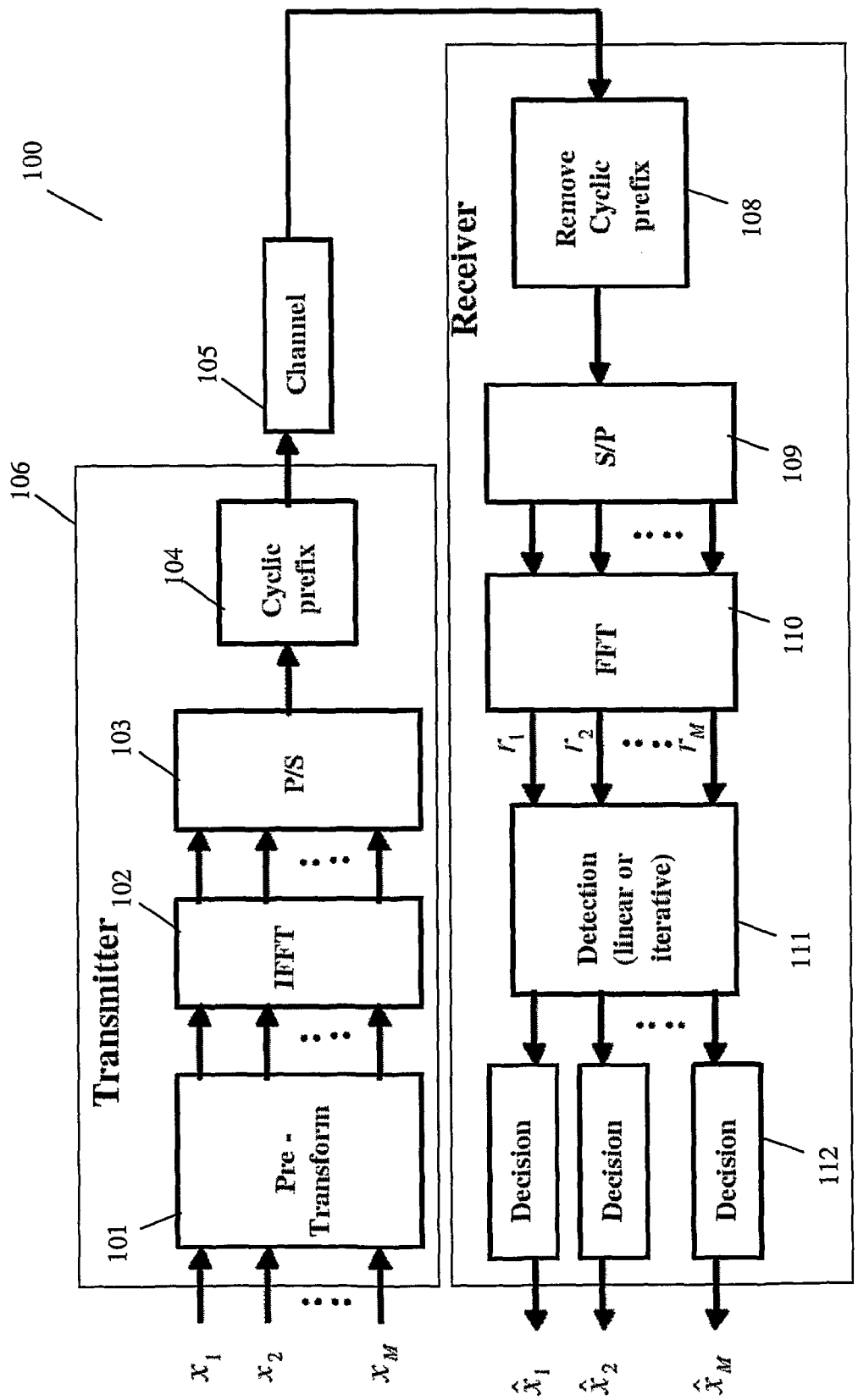
FIG. 1 shows a transmitter/receiver system 100 according to an embodiment of the invention.

FIG. 1 shows a transmitter/receiver system 100 according to an embodiment of the invention.

The transmitter/receiver system 100 is formed according to a PT-OFDM (Pre-Transform Orthogonal Frequency Division Multiplexing) system. For simplicity, it is assumed that $M=2^k$, e.g. M=32, and that M information symbols $x_m$, m=1, 2, ..., M are transmitted at the same time in form of one OFDM symbol. For transmitting these information symbols, the vector of information symbols, $\underline{x}=[x_1, x_2, \ldots, x_m]^T$, in the following also called the original signal vector, is fed to a pre-transform unit 101. The superscript T denotes the transpose operator.

The pre-transform unit 101 calculates a vector of modulation symbols $\underline{s}=[s_1, s_2, \ldots, s_M]^T$ for the original signal vector according to $$\underline{s} = \underline{W} \cdot \underline{x}.$$

$\underline{W}$ represents a PT (pre-transform) matrix of size M×M. There is no loss of code rate in terms of number of information symbols transmitted per channel use. In the case of an OFDM system, the matrix $\underline{W}$ would simply be an identity matrix.

The vector (or block) of modulation symbols s generated by the pre-transform unit 101 is then passed to an IFFT (inverse fast Fourier transform) unit 102 which carries out an inverse fast Fourier transform on the block of modulation symbols.

The inverse fast Fourier transform is used in this embodiment as an efficient realization of an inverse Fourier transform. Other domain transformations can be used instead of the inverse fast Fourier transform, for example an inverse discrete sine transform or an inverse discrete cosine transform.

The vector generated by the IFFT unit 102 is then mapped from parallel to serial, i.e. to a sequence of signal values, by a P/S (parallel to serial) unit 103. A cyclic prefix unit 104 inserts a cyclic prefix into the sequence of signal values to form a PT-OFDM symbol which is transmitted via a channel 105.

The cyclic prefix that is inserted has a duration no shorter than the maximum channel delay spread. The channel 105 is assumed to be a quasi/static frequency selective Rayleigh fading channel corrupted by additive white Gaussian noise (AWGN).

The pre-transform unit 101, the P/S unit 102 and the cyclic prefix unit 104 are part of a transmitter 106.

The PT-OFDM symbol is received by a receiver 107. A cyclic prefix removal unit 108 removes the cyclic prefix from the PT-OFDM symbol. The resulting sequence of signal values is mapped from parallel to serial by a S/P unit 109 and is domain transformed according to a fast Fourier transform by an FFT (fast Fourier transform) unit 110. Analogously to the IFFT unit 102, the FFT unit 110 can in other embodiments also be adapted to perform a discrete sine transform or a discrete cosine transform or another domain transformation.

The output vector of the FFT unit 110 is denoted by $\underline{r}=[r_1, r_2, \ldots, r_m]^T$ and can be written as $$\underline{r} = \Gamma \cdot \underline{s} + \underline{n} = \Gamma \cdot \underline{W} \cdot \underline{x} + \underline{n}$$

where $\Gamma = \text{diag}(h_1, h_2, \ldots, h_M)$ is a diagonal matrix with diagonal elements $h_1, \ldots, h_M$ which are the frequency domain channel coefficients and $\underline{n}$ is the AWGN vector of dimension M×1. The frequency domain channel coefficients are given by $h_m = \Sigma_n \tilde{h}_n \exp(-j2\pi n(m-1)/M)$, m=1, 2, ..., M, assuming a sampled spaced Lth order FIR (finite input response) channel model $\{\tilde{h}_n\}_{n=0}^L$.

The output vector r of the FFT unit 110 is fed to a detection unit 111. The detection unit 111 performs an iterative detection algorithm. An iteration (corresponding to an iteration index i) of the iterative detection algorithm corresponds to three stages, a reconstruction step, a linear filtering step and a decision step.

In the ith reconstruction step, i.e. in the reconstruction step of the iteration corresponding to the iteration index i, the $m_i$th component of the vector r is estimated. This is done by using the previously detected symbol $\hat{x}_{i-1}$ (i.e. the signal vector detected in the previous iteration). $m_i$ corresponds to the frequency domain channel with the ith smallest amplitude. In the filtering step, the cross interference of the data is removed by a linear filter denoted by G. In the detection step, a tentative (hard or soft) decision (denoted by dec(.)) is made to generate the symbol detected in the ith iteration, $\hat{x}_i$. When the last iteration has been performed (e.g. after a given number of iterations, e.g. 4, has been performed) the detected symbols $\hat{x}_i$ are output by decision units 112.

The algorithm is initialized with $\underline{r}_0 = \underline{r}$, $\underline{\tilde{x}} = G\underline{r}_0$ and $\underline{x}_0 = \text{dec}(\underline{\tilde{x}}_0)$.

The ith iteration is given by:

$$\underline{r}_i = \underline{1}_{m_i} \underline{r}_{i-1} + \underline{0}_{m_i} \Gamma \underline{W} \hat{x}_{i-1}$$

$$\underline{\tilde{x}}_i = G \underline{r}_i$$

$$\underline{\hat{x}}_i = \text{dec}(\underline{\tilde{x}}_i)$$

where $0_m$ is defined as a diagonal matrix with value 1 on its mth diagonal term and 0 otherwise, and $1_m$ as a diagonal matrix with value 0 on its mth diagonal term and 1 otherwise.

The matrix $\underline{W}$, which defines the pre-transformation carried out by the pre-transform unit 101 is chosen according to the following criteria $\underline{W}$ should be unitary and $\underline{W}$ should have elements which are of constant amplitude The first requirement serves to preserve the capacity of the system, while the second requirement maximizes the worse post-filtered SNR (signal-to-noise ratio) at every detection step when there is no error propagation.

Given that the matrix satisfies the criteria mentioned, there exist certain transforms that lead to better performance than others when error propagation occurs. The effect is most striking when a ZF filter is used for the filtering step and when the transform size is small.

Using the Walsh Hadamard transform performs worse at high SNR condition when QPSK (quadrature phase shift keying) signal constellation is used. This is because the error propagation leads to an "error constellation" which increases the bit error performance as compared to the case when other well designed transforms are used instead.

In this embodiment, a transform is used according to a design which gives a more random-like "error constellation" since error propagation is bound to occur. This is achieved by using a pre-transformation according to the matrix $\underline{W}_0$ defined in the following formula, wherein the transform size M, as stated above, is assumed to be a power of 2.

$$\underline{W}_0 = \underline{F} \times \text{diag}(1, \alpha, \ldots, \alpha^{M-1})$$

where $\alpha = \exp(-j\pi/(2M))$ and $\underline{F}$ is the FFT matrix of size M.

It can be easily verified that $\underline{W}_0$ is unitary and has elements with constant amplitude.

Coincidentally, this transform is proposed for maximum likelihood detection (MLD) in order to exploit maximum channel diversity in [3]. However, the approach that is adopted here is different since $\underline{W}_0$ is used to minimize the error propagation caused by the transform and $\underline{W}_0$ is not used for MLD which is very complex in implementation, in the order of 4M for QPSK constellation. Note also that when $\underline{W}_0$ is used for the transform, the PT-OFDM system shown in FIG. 1 becomes a single carrier frequency domain equalization (SC-FDE) system whereby the symbols are pre-rotated according to the phase rotation diagonal matrix defined in the formula for $\underline{W}_0$.

Advantageously, this means that the peak-to-average-power ratio is reduced to the smallest possible when the signal constellation used has constant amplitude.

Simulations show that by using a pre-transform according to the matrix $\underline{W}_0$, higher performance can be achieved in terms of lower BER (bit error rate), especially when the SNR is high. Therefore, if the noise variance is not known at the receiver, the designed transform allows performance to be improved significantly.

Under the assumption that the variance of the noise corrupting the channel 105 is known, the MMSE (minimum mean square error) filter described in the following can be used by the detection unit 111 to improve the performance of the transmitter/receiver system 100.

Taking into account the MMSE criteria and assuming that previous detected symbols are correct for each reconstruction, the linear filter for the ith (i=1, 2, ..., M) iteration can be derived:

$$\underline{G} = \underline{W}^{-1} \cdot \underline{B} = \underline{W}^{-1} \cdot \mathrm{diag}(\beta_1, \beta_2, \dots, \beta_M)$$

where $$\beta_m = \begin{cases} h_m^{-1}, & \text{where } m = \{m_n, n = 1, \dots, i\} \\ h_m^*/(|h_m|^2 + \sigma^2), & \text{otherwise} \end{cases}$$

and $\sigma^2$ is the noise variance. This G is used in the filtering step of the reconstruction algorithm carried out by the detection unit 111 as described above.

For the initial iteration of the reconstruction algorithm, the MMSE filter with $$\beta_m = h_m^*/(|h_m|^2 + \sigma^2), m=1, \dots, mM.$$

is used.

When the matrix W is chosen as unitary and has constant amplitude elements, even when the MMSE filter is used, the choice of $m_i$ is unchanged (corresponding to the frequency domain channel with the ith smallest amplitude). That is, this choice still maximizes the worse post-filtered SNR at every detection step under the assumption that the previous detection is correct.

Simulations show that using this filter, the error floor can be reduced and superior performance can be achieved for high SNR. Note that this MMSE filter requires the knowledge that the noise variance is known at the receiver. However, simulations show that it is robust to noise variance errors.

In one embodiment, the reconstruction is extended as will be described with reference to FIG. 2 and FIG. 3.

Figure 2:
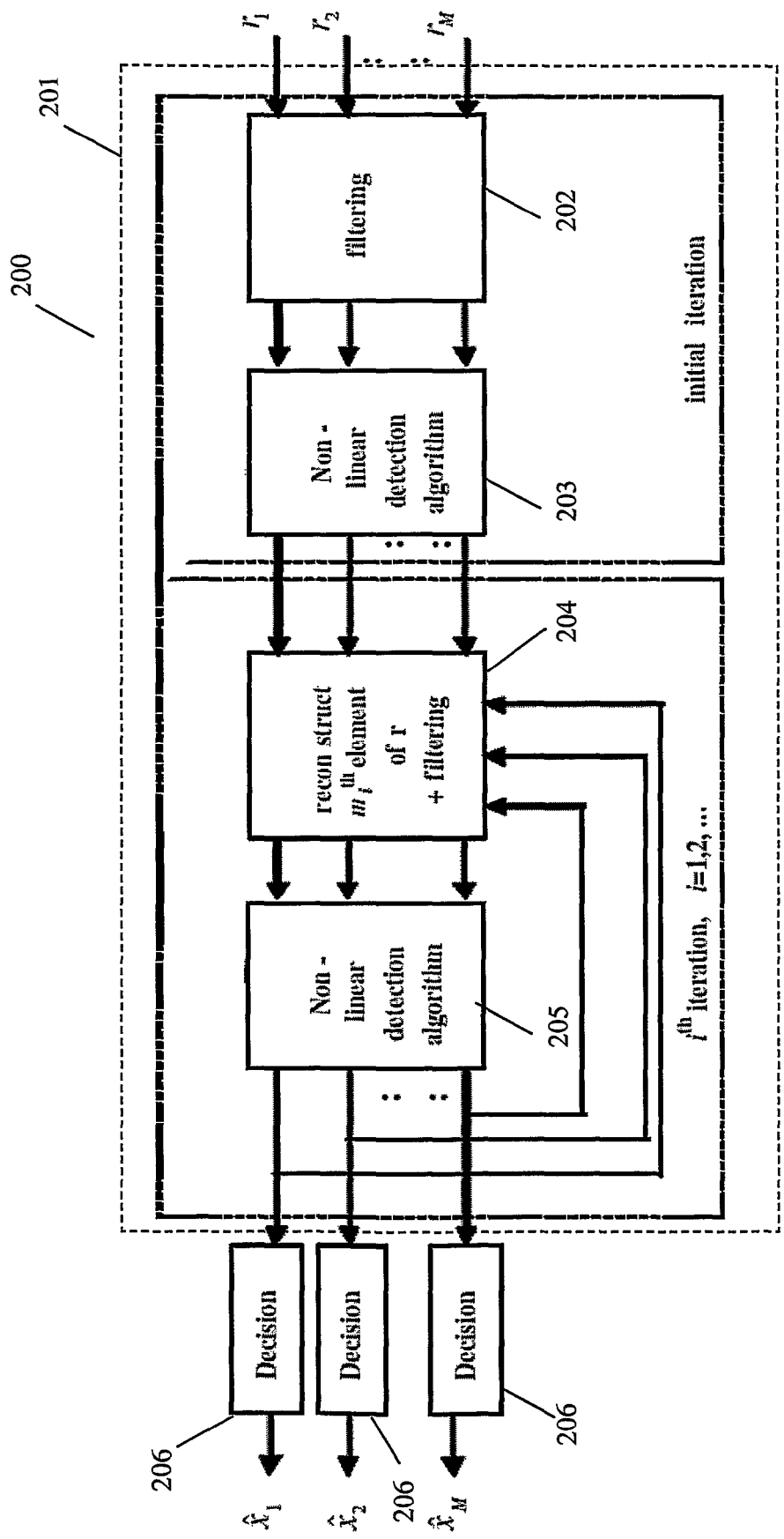
FIG. 2 shows a receiver 200 according to an embodiment of the invention.

FIG. 2 shows a receiver 200 according to an embodiment of the invention.

The receiver 200 may be used instead of the receiver 107 shown in FIG. 1 in the transmitter/receiver system 100. The receiver 200 comprises a detection unit 201 and, corresponding to the decision units 112 of the receiver 107 shown in FIG. 1, decision units 206. Analogously to the receiver 107, the receiver 200 comprises other functional units, for example an FFT unit, which are not shown in FIG. 2.

Analogously to the detection unit 111, a vector r, e.g. the output vector of an FFT unit performing an FFT, is fed to the detection unit 201.

A filtering unit 202 of the receiver 201 performs a filtering step of a reconstruction algorithm, e.g. the initial filtering step of the reconstruction algorithm described above. The result of the filtering step, denoted by $\tilde{x}_0$ in accordance to the above description of the reconstruction algorithm is supplied to a first nonlinear detection unit 203.

The receiver further comprises a second nonlinear detection algorithm unit 205. The structure of the first nonlinear detection unit 203 and the second nonlinear detection unit 205 are described in the following with reference to FIG. 3.

Figure 3:
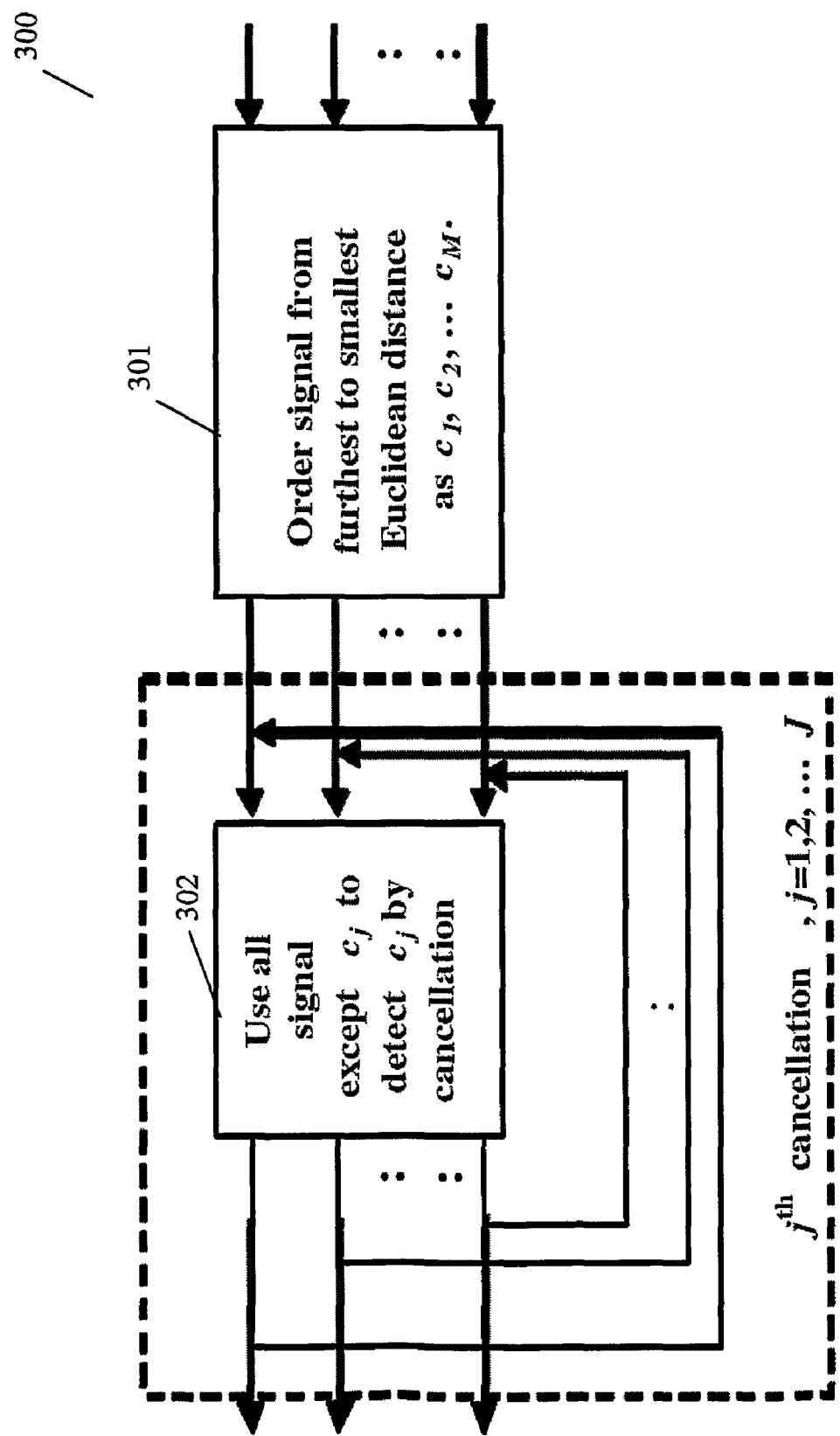
FIG. 3 shows a nonlinear detection unit according to an embodiment of the invention.

FIG. 3 shows a nonlinear detection unit 300 according to an embodiment of the invention.

The nonlinear detection unit performs an ordered interference cancellation algorithm as will be described in the following.

The input vector of the non-linear detection unit 300 is a soft estimate of a transmitted signal (in case of the first nonlinear detection unit, this is the output $\tilde{x}^0$ of the filtering unit 202). The input vector of the non-linear detection unit 300 is fed to an ordering unit 301.

The ordering unit 301 performs an ordering step by obtaining the minimum Euclidean distance of the input to any point of the signal constellation. Then, the components of the input vector are ordered from largest to smallest (minimal) Euclidean distance and a hard decision is performed on the components of the input vector to form $c_1, c_2, \dots, c_M$.

$c_1, c_2, \dots, c_M$ are fed to a cancellation unit 302 which performs the following algorithm:

For interference cancellation j=1, ..., J.
(i) use $\{c_k\}_{k \neq j}$ to cancel from reconstructed received signal $\underline{r}_i$ to obtain a soft estimate of $c_j$
(ii) perform hard decision on the soft estimate and update the newly detected $c_j$
(iii) increment j and continue with (i)

J is the number of cancellation steps and is for example chosen equal to M.

Illustratively, the interference cancellation algorithm uses the "best" components of the estimate, in the sense that they have minimal Euclidean distance to the signal constellation to improve the "worse" components, which have a higher Euclidean distance to the signal constellation.

The output of the first cancellation unit 302 is fed to the reconstruction unit 204. The reconstruction unit 204 performs the reconstruction step and the filtering step for the ith iteration (where i=1, 2, . . . ) according to the reconstruction algorithm described above.

The result of each iteration performed by the reconstruction unit 204 is fed to the second non-linear detection unit 205. The output of the second non-linear detection unit 205 is fed back to the reconstruction unit 204 for the next iteration to be performed except for the last iteration, when the output is supplied to the decision units 206 which generate the output of the receiver 200.

The receiver 200 can also be used with a pre-transform (according to a matrix W) according to prior art and with a filter (according to a matrix G) according to prior art. This means that the idea of ordering the signal values according to a distance measure and using the signal values which are best (in terms of smallest distance) to cancel the interference from the other signal values is independent from using a pre-transformation comprising a phase rotation matrix and from using a filter which is dependent on the variance of the noise of the channel used for data transmission.

In the above, the following documents are cited:
[1] Receiver Having a Signal Reconstructing Section for Noise Reduction, System and Method Thereof, International Application Number: PCT/SG02/00194
[2] Z. Lei, Y. Wu, C. K. Ho, S. Sun, P. He, and Y. Li, "Iterative detection for Walsh-Hadamard Transformed OFDM", in Proc. 57$^{th}$ IEEE Vehicular Technology Conf., Jeju, Korea, April 2003, pp. 637-640

The invention claimed is:

1. A method for receiving a signal comprising:
receiving a modulated carrier signal;
demodulating the modulated carrier signal to produce a block of modulation symbols;
processing the first block of modulation symbols by a first domain transformation to produce a second block of modulation symbol; and
processing the second block of modulation symbols by a linear filter and an inverse pre-transformation wherein the inverse pre-transformation comprises a phase rotation of the filtered second block of the modulation symbols, which corresponds to the multiplication of the filtered second block of modulation symbols with a phase rotation matrix and wherein the inverse pre-transformation further comprises a domain transformation of the block of modulation symbols to generate a third block of modulation symbols;
the third block of modulation symbols is processed in that the third block of modulation symbols are ordered according to their respective minimum Euclidean distances to their closest signal constellations descendingly;
the third block of modulation symbols is further updated by an interference cancellation process according to the order, such that according to the interference cancellation process, interference is cancelled, using those signal modulation symbols of the third block of modulation symbols having smallest Euclidean distances, from the other modulation symbols of the third block of modulation symbols.

2. A method according to claim 1, wherein the second domain transformation is performed after the phase rotation.

3. A method according to claim 1, wherein the second domain transformation is a discrete sine transformation, a discrete cosine transformation or a discrete Fourier transformation.

4. A method according to claim 1, wherein the phase rotation rotates at least one of the components of the filtered first block of modulation symbols by an angle that is not zero.

5. A method according to claim 1, wherein the phase rotation matrix is a diagonal matrix.

6. A method according to claim 5, wherein the phase rotation matrix has the form $diag(1, \alpha, \ldots, \alpha^{M-1})$ where $\alpha = \exp(-j\pi/(2M))$ and M is the dimension of the filtered first block of modulation symbols.

7. A receiver for receiving a signal comprising:
a receiving unit, adapted to receive a modulated carrier signal;
a demodulation unit adapted to demodulate the modulated carrier signal to produce a first block of modulation symbols;
a domain transformation unit adapted to process the first block of modulation symbols by a first domain transformation to produce a second block of modulation symbols;
a processing unit adapted to process the second block of modulation symbols by a linear filter and an inverse pre-transformation, wherein the inverse pre-transformation comprises a phase rotation of the filtered second block of modulation symbols, which corresponds to the multiplication of the filtered second block of modulation symbols with a phase rotation matrix, and wherein the inverse pre-transformation further comprises a second domain transformation of the filtered second block of modulation symbols to generate a third block of modulation symbols;
an ordering unit adapted to order the third block of modulation symbols according to their respective minimum Euclidean distances descendingly;
a cancellation unit adapted, using those signal modulation symbols of the third block of modulation symbols having smallest Euclidean distances, to cancel interference from the other modulation symbols of the third block of modulation symbols.

* * * * *